United States Patent
Komatsu et al.

(10) Patent No.: US 12,437,619 B2
(45) Date of Patent: Oct. 7, 2025

(54) NOTIFICATION DEVICE, NOTIFICATION METHOD, AND COMPUTER-READABLE STORAGE MEDIUM

(71) Applicant: JVCKENWOOD Corporation, Yokohama (JP)

(72) Inventors: Seiji Komatsu, Yokohama (JP); Takayuki Sugahara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/676,552

(22) Filed: May 29, 2024

(65) Prior Publication Data

US 2024/0312322 A1    Sep. 19, 2024

Related U.S. Application Data

(63) Continuation of application No. PCT/JP2022/042677, filed on Nov. 17, 2022.

(30) Foreign Application Priority Data

Dec. 6, 2021  (JP) .................. 2021-197560

(51) Int. Cl.
- *G06F 3/01* (2006.01)
- *G06F 3/14* (2006.01)
- *G08B 7/00* (2006.01)

(52) U.S. Cl.
CPC ............. *G08B 7/00* (2013.01); *G06F 3/013* (2013.01); *G06F 3/14* (2013.01)

(58) Field of Classification Search
CPC ............. G06F 3/013; G06F 3/14; G08B 7/00
See application file for complete search history.

(56) References Cited

U.S. PATENT DOCUMENTS

| | | | |
|---|---|---|---|
| 2013/0083011 A1* | 4/2013 | Geisner | G06F 3/013 |
| | | | 345/419 |
| 2018/0143433 A1 | 5/2018 | Fujimaki et al. | |

(Continued)

FOREIGN PATENT DOCUMENTS

| | | |
|---|---|---|
| JP | 2018-082363 | 5/2018 |
| JP | 2018-088028 | 6/2018 |
| WO | 2016/170717 | 10/2016 |

OTHER PUBLICATIONS

International Search Report and Written Opinion for International Application Serial No. PCT/JP2022/042677 mailed on Jan. 31, 2023, 9 pages.

*Primary Examiner* — Matthew A Eason
*Assistant Examiner* — Scott D Au
(74) *Attorney, Agent, or Firm* — Amin, Turocy & Watson, LLP

(57) ABSTRACT

A notification device includes: a display unit configured to display an image; a vibration unit configured to stimulate a sense of touch for a user; a target identification unit configured to identify a direction from the user to a target; a region determination unit configured to determine which of a first field-of-view region having a predetermined region, a second field-of-view region adjacent to the first field-of-view region, and a third field-of-view region adjacent to the second field-of-view region is in the direction identified by the target identification unit; and a control unit configured to control the display unit and the vibration unit based on a determination result of the region determination unit. When the direction is to the second field-of-view region, the control unit displays an image indicating the direction on the display unit and controls the vibration unit according to the direction.

7 Claims, 7 Drawing Sheets

(56) References Cited

U.S. PATENT DOCUMENTS

2018/0181201 A1\* 6/2018 Grant ................... G06F 3/012
2018/0181367 A1\* 6/2018 Goi ..................... G06F 1/163

\* cited by examiner

NOTIFICATION DEVICE, NOTIFICATION METHOD, AND COMPUTER-READABLE STORAGE MEDIUM

CROSS-REFERENCE TO RELATED APPLICATIONS

This application is a Continuation of PCT International Application No. PCT/JP2022/042677 filed on Nov. 17, 2022 which claims the benefit of priority from Japanese Patent Application No. 2021-197560 filed on Dec. 6, 2021, the entire contents of both of which are incorporated herein by reference.

BACKGROUND

The present disclosure relates to a notification device, a notification method, and a computer-readable storage medium.

In recent years, for example, a head mounted-type display device (head-mounted display (HMD)) which is used while being worn on the head of a user is known as a technology to implement virtual reality (VR). Such a display device can superimpose an image of a virtual space on an actual image acquired from an external source and display the superimposed image.

A technology that uses such a display device to display a surrounding scenery without blocking the user's field of view and to notify the user of the position of a target that the user is looking for is described, for example, in Japanese Patent Application Laid-open No. 2018-088028.

The device described in Japanese Patent Application Laid-open No. 2018-088028 notifies the user of the direction of a target by stimulating the user's sense of touch based on the direction of the target relative to the user. In this case, the user desires to accurately know specifically a direction in which the target is present.

SUMMARY

A notification device according to one aspect of the present disclosure includes: a display unit configured to display an image; a vibration unit configured to stimulate a sense of touch for a user; a target identification unit configured to identify a direction from the user to a target; a region determination unit configured to determine which of a first field-of-view region having a predetermined region, a second field-of-view region adjacent to the first field-of-view region, and a third field-of-view region adjacent to the second field-of-view region is in the direction identified by the target identification unit; and a control unit configured to control the display unit and the vibration unit based on a determination result of the region determination unit. When the direction is to the second field-of-view region, the control unit is configured to display an image indicating the direction on the display unit and control the vibration unit according to the direction.

A notification method according to another aspect of the present disclosure includes: identifying a direction from a user to a target; determining which of a first field-of-view region having a predetermined region, a second field-of-view region adjacent to the first field-of-view region, and a third field-of-view region adjacent to the second field-of-view region is in the direction identified; and when the direction is to the second field-of-view region, displaying an image indicating the direction and controlling vibration to stimulate a sense of touch according to the direction.

A non-transitory computer-readable storage medium according to still another aspect of the present disclosure stores a computer program causing a computer to execute: identifying a direction from a user to a target; determining which of a first field-of-view region having a predetermined region, a second field-of-view region adjacent to the first field-of-view region, and a third field-of-view region adjacent to the second field-of-view region is in the direction identified; and when the direction is to the second field-of-view region, displaying an image indicating the direction and controlling vibration to stimulate a sense of touch according to the direction.

DETAILED DESCRIPTION

Embodiments of a notification device, a notification method, and a computer program according to the present invention will be described in detail below with reference to the accompanying drawings. The present invention is not limited by the following embodiments.

Notification Device

Figure 1:
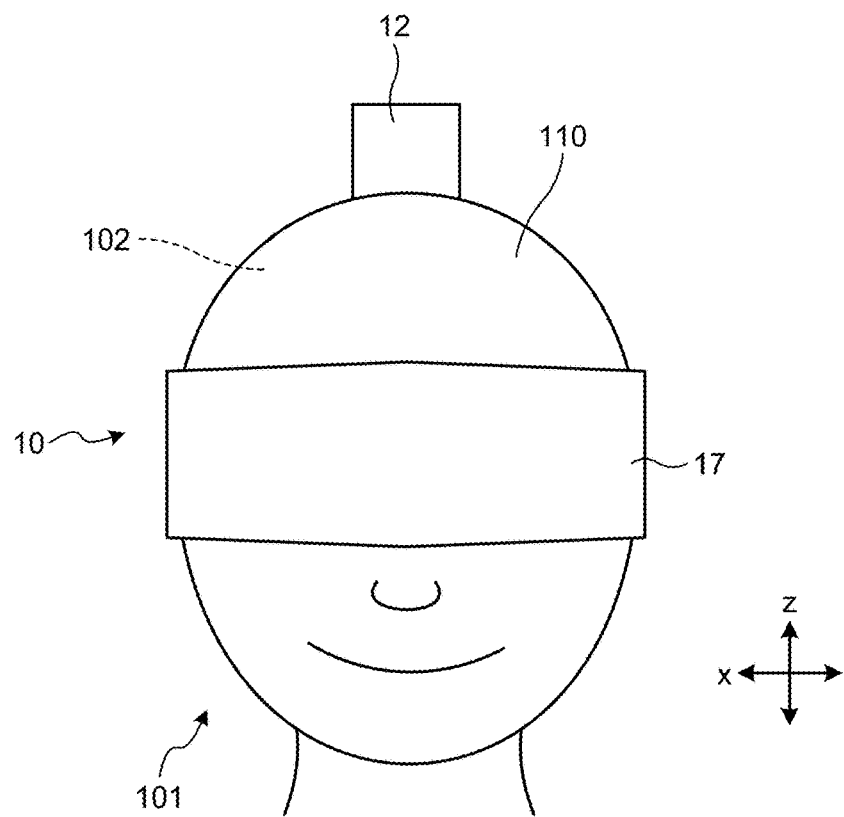
FIG. 1 is a front view of a notification device according to the present embodiment in a worn state.
Figure 2:
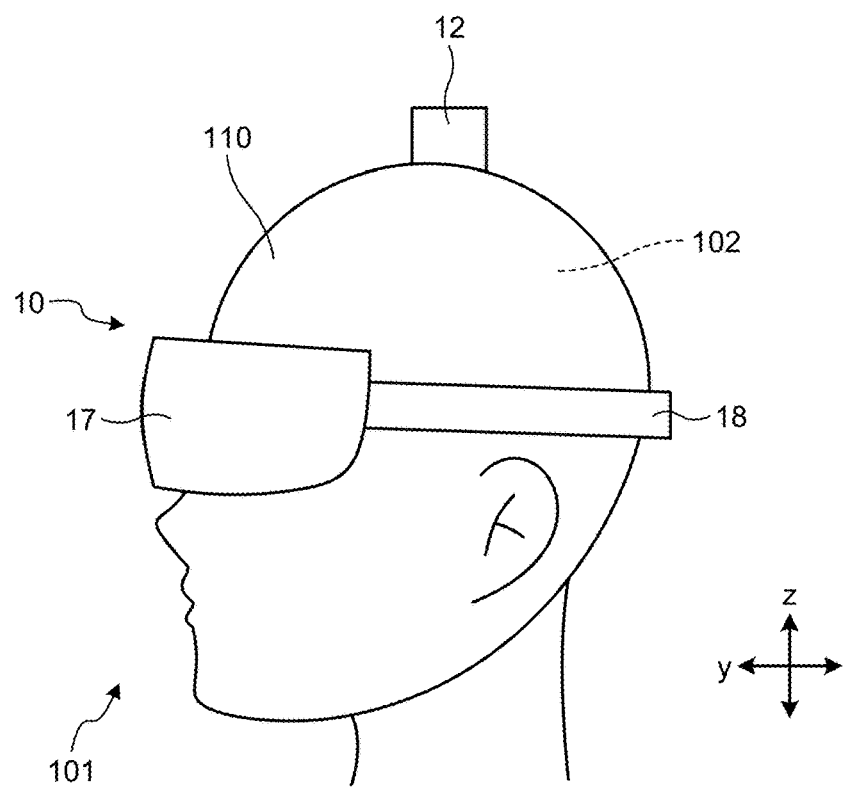
FIG. 2 is a side view of the notification device in a worn state.

FIG. 1 is a front view of a notification device according to the present embodiment in a worn state, and FIG. 2 is a side view of the notification device in a worn state.

As illustrated in FIGS. 1 and 2, a notification device 10 can be worn on the head 102 of a user 101. The notification device 10 is mounted on a helmet 110 worn on the head 102 of the user 101. The notification device 10 is configured such that a camera 12, a display unit 17, a vibration unit 18, and the like described below are mounted on the helmet 110. The notification device 10 is not limited to the configuration mounted on the helmet 110, but may be mounted on a member that can be worn on the head 102 of the user 101, for example, may be glasses.

In the following explanation, the left-right direction is denoted as x-direction, the front-back direction is denoted as y-direction, and the up-down direction is denoted as z-direction with respect to the head 102 (helmet 110) of the user 101. In other words, a target 200 as seen from the user 101 will be described by three-dimensional spatial coordinates (x, y, z).

Figure 3:
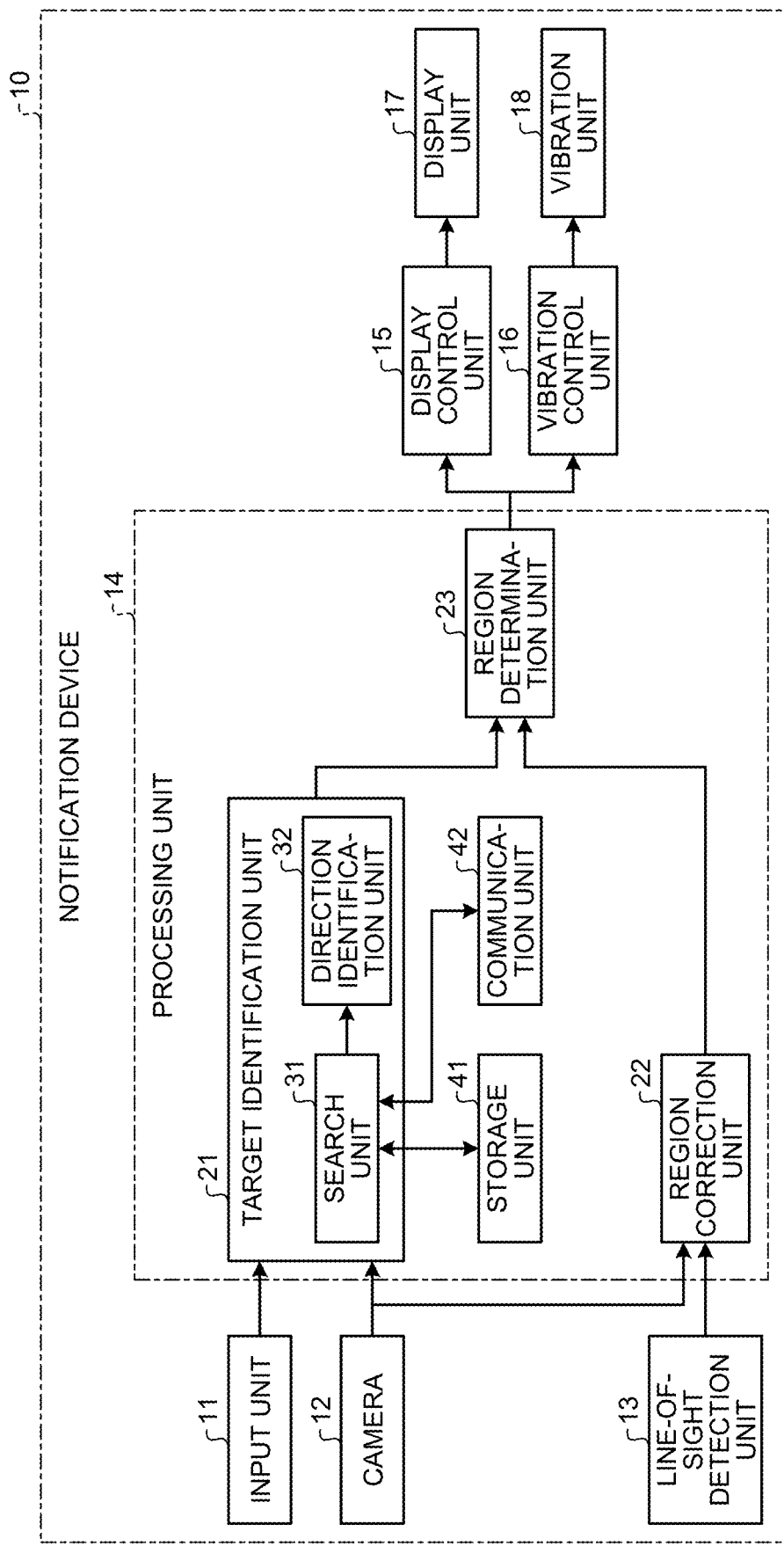
FIG. 3 is a block configuration diagram depicting the notification device.

FIG. 3 is a block configuration diagram depicting the notification device.

As illustrated in FIGS. 1 to 3, the notification device 10 includes an input unit 11, the camera (image acquisition unit) 12, a line-of-sight detection unit 13, a processing unit 14, a display control unit 15, a vibration control unit 16, the display unit 17, and the vibration unit 18. The display control unit 15 and the vibration control unit 16 may be configured as a single control unit. Here, at least the camera 12, the line-of-sight detection unit 13, the display unit 17, and the vibration unit 18 are provided on the helmet 110, while the input unit 11, the processing unit 14, the display control unit 15, and the vibration control unit 16 may be provided in the helmet 110 or may be worn separately by the user 101.

The input unit 11 can be operated by the user 101. The input unit 11 is connected to the processing unit 14. The user 101 uses the input unit 11 to input a target 200 to a target identification unit 21 in the processing unit 14. As used herein the target 200 is something that the user 101 desires to find, such as an architecture such as a building or house, a structure such as a radio tower, or an animal such as a human being or a pet.

The input unit 11 is, for example, a keyboard, a touch panel display, a mobile terminal, a tablet terminal, and the like. The user 101 uses the input unit 11 to input an image of the target 200 or input the name of the target 200, for example. The input unit 11 may be, for example, a microphone. The user 101 uses the microphone as the input unit 11 to input the name, features, and the like of the target 200.

The camera 12 functions as an image acquisition unit to acquire images of the surroundings of the user 101. The camera 12 is mounted on the top of the helmet 110. It is preferable that the camera 12 has a wide-angle lens and acquires an image of the scenery of the entire surroundings (360 degrees) of the user 101. The camera 12 is connected to the processing unit 14 and outputs an image (peripheral image) acquired by taking a picture to the target identification unit 21 and a region correction unit 22.

The line-of-sight detection unit 13 detects the line of sight of the user 101. The line-of-sight detection unit 13 detects the lines of sight by the left and right eyes 103L and 103R of the user 101. The line-of-sight detection unit 13 is, for example, a line-of-sight detection device capable of detecting a line of sight based on the position of the pupil of the user 101 and the position of the corneal reflection image, or a line-of-sight detection device capable of detecting a line of sight based on the position of the inner corner of the eye of the user 101 and the position of the iris.

The line-of-sight detection unit 13 is connected to the processing unit 14 and outputs the detected line of sight of the user 101 to the region correction unit 22.

The processing unit 14 includes the target identification unit 21, the region correction unit 22, and a region determination unit 23. The processing unit 14 is connected to the input unit 11, the camera 12, and the line-of-sight detection unit 13, and also connected to the display control unit 15 and the vibration control unit 16. The processing unit 14 receives data of the target 200 by the input unit 11, the surrounding image acquired by the camera 12, and the line of sight of the user 101 input from the line-of-sight detection unit 13. The processing unit 14 processes the data of the target 200, the surrounding image, and the line of sight of the user 101, and outputs processing results to the display control unit 15 and the vibration control unit 16.

Here, the processing unit 14 includes at least one of a central processing unit (CPU), a digital signal processor (DSP), a random access memory (RAM), and a read only memory (ROM). The processing unit 14 is an arithmetic processing unit (control unit) composed of, for example, a CPU. The processing unit 14 loads a stored computer program into a memory and executes instructions included in the computer program. The processing unit 14 includes a not-illustrated internal memory which is used for temporary storage of data in the processing unit 14.

The target identification unit 21 identifies the position of the target 200 and identifies the direction from the user 101 to the target 200. The target identification unit 21 includes a search unit 31 and a direction identification unit 32. The search unit 31 is connected to the direction identification unit 32 and outputs a search result to the direction identification unit 32.

The search unit 31 searches for the target 200 input from the input unit 11 and identifies the position at which the target 200 is located. The search unit 31 is connected to a storage unit 41 and a communication unit 42. The storage unit 41 stores the target 200 input from the input unit 11. In this case, the storage unit 41 stores the target 200 as image, name, and the like.

The storage unit 41 includes, for example, a memory card, a hard disk drive (HDD), a solid state drive (SSD), an external storage device, and the like. The storage unit 41 may be, for example, a recording unit such as a semiconductor memory device such as a random access memory (RAM) or a flash memory included in the processing unit 14.

The communication unit 42 is capable of communication through a network. Here, the network is a communication network such as the Internet.

The search unit 31 has an image recognition function. The search unit 31 finds an image of the target 200 input from the input unit 11 and stored in the storage unit 41, from the peripheral image acquired by the camera 12. In other words, the search unit 31 finds an image of the target 200 in the peripheral image. In this case, the search unit 31 determines an image in the peripheral image to be the image of the target 200 when the degree of matching between the image in the peripheral image and the image of the target 200 is a preset degree of matching (for example, 80%) or greater.

The search unit 31 also searches for the target 200 using the communication unit 42. The search unit 31 uses the communication unit 42 to find the image and/or name of the target 200 input from the input unit 11 and stored in the storage unit 41, through the network. In other words, the search unit 31 finds the image and/or name of the target 200 through the network. In this case, the search unit 31 identifies the position of the target 200 found in map information or the like on the network, for example, as an address.

The direction identification unit 32 identifies the direction from the user 101 to the target 200, based on the position of the target 200 found by the search unit 31 by search. The notification device 10 is mounted on the helmet 110 worn by the user 101, and the processing unit 14 has a three-dimensional spatial coordinate system at the center of the helmet 110 (for example, the attachment position of the camera 12). The direction identification unit 32 replaces the position of the target 200 found by the search unit 31 by search with the spatial coordinate system and identifies the azimuth from the user 101 to the target 200 in the spatial coordinate system as a direction.

The region correction unit 22 corrects the range (size) and position of a field-of-view region of the user 101. The region correction unit 22 receives the peripheral image acquired by the camera 12 and also receives the orientation of the line of sight of the user 101 detected by the line-of-sight detection unit 13. The region correction unit 22 corrects the range (size) and position of a first field-of-view region θ1 based on the peripheral image and the orientation of the line of sight of the user 101.

Figure 4:
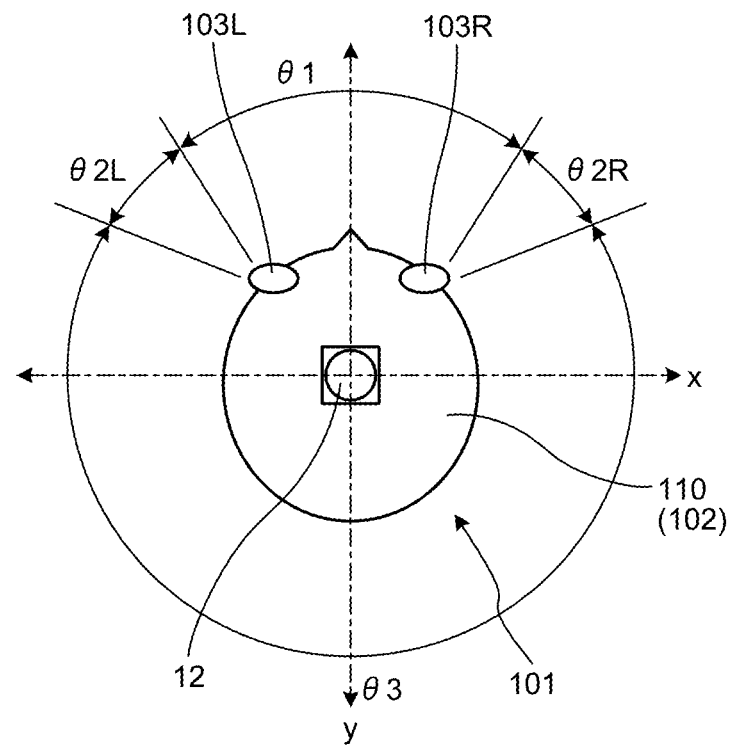
FIG. 4 is an illustration of a field-of-view region for a user.

FIG. 4 is an illustration of a field-of-view region for a user.

As illustrated in FIG. 4, the field of view of the user 101 is divided into: a first field-of-view region θ1, which is an effective field of view and has a predetermined region; second field-of-view regions θ2L and θ2R, which are peripheral fields of view and adjacent to the first field-of-view region θ1; and a third field-of-view region θ3, which is outside the effective field of view and the peripheral fields of view and adjacent to the second field-of-view regions θ2L and θ2R. The first field-of-view region θ1 is the front with respect to the eyes 103L and 103R of the user 101 and is an effective field of view in which the shape of an object can be recognized in details. The second field-of-view regions θ2L and θ2R are the front left and the front right with respect to the eyes 103L and 103R of the user 101 and are peripheral fields of view in which the shape of an object can be recognized vaguely. The third field-of-view region θ3 is the side and back of the user 101 with respect to the eyes 103L and 103R of the user 101 and is an ineffective field of view outside the effective field of view and the peripheral fields of view, in which an object is unable to be recognized. The sizes (angles) of the first field-of-view region θ1, the second field-of-view regions θ2L and θ2R, and the third field-of-view region θ3 are set in advance.

As illustrated in FIGS. 3 and 4, the region correction unit 22 corrects the size of the first field-of-view region θ1 according to the amount of edges extracted from an image included in the first field-of-view region θ1 and the second field-of-view region θ2. In other words, the camera 12 acquires a peripheral image of the user 101. The peripheral image acquired by the camera 12 includes a peripheral image of the first field-of-view region θ1 and the second field-of-view region θ2. As used herein the edges are edges of a scenery in the peripheral image of the first field-of-view region θ1 and the second field-of-view region θ2. As used herein the scenery is an image that includes images of architectures, structures, cars, people, billboards, and the like and is not a particular image. Specifically, the region correction unit 22 determines the boundary between adjacent pixels to be an edge when the difference in brightness between the adjacent pixels is greater than a preset threshold in the peripheral image of the first field-of-view region θ1 and the second field-of-view region θ2.

A large amount of edges in the peripheral image of the first field-of-view region θ1 and the second field-of-view region θ2 means a large amount of information, for example, an image of an urban area. On the other hand, a small amount of edges means a small amount of information, for example, an image of the ocean or a plain. The region correction unit 22 narrows the first field-of-view region θ1 if the amount of edges in the first field-of-view region θ1 and the second field-of-view regions θ2 is greater than a preset determination value, and widens the first field-of-view region θ1 if the amount of edges is smaller than the determination value.

The region correction unit 22 also identifies a gaze point of the user 101 based on the line of sight of the user 101 detected by the line-of-sight detection unit 13, and corrects the position of the first field-of-view region θ1 according to the position of the gaze point. For example, if the line of sight is oriented to the left with respect to the orientation of the face of the user 101, it means that the gaze point of the user 101 is shifted to the left. Thus, if the position of the gaze point is to the left beyond a predetermined range, the position of the first field-of-view region θ1 is corrected to the left according to the position of the gaze point. On the other hand, if the line of sight is oriented to the right with respect to the orientation of the face of the user 101, it means that the gaze point of the user 101 is shifted to the right. Thus, if the position of the gaze point is to the right beyond a predetermined range, the position of the first field-of-view region θ1 is corrected to the right according to the position of the gaze point.

The region determination unit 23 determines which of the first field-of-view region θ1, the second field-of-view regions θ2L and θ2R, and the third field-of-view region θ3 is in the direction from the user 101 to the target 200 identified by the target identification unit 21. In other words, the region determination unit 23 is connected to the direction identification unit 32 and the region correction unit 22, and also connected to the display control unit 15 and the vibration control unit 16. The region determination unit 23 receives the direction from the user 101 to the target 200 in the spatial coordinate system identified by the direction identification unit 32, and also receives the range and position of the first field-of-view region θ1 corrected by the region correction unit 22. The region determination unit 23 has preset sizes of the first field-of-view region θ1, the second field-of-view regions θ2L and θ2R, and the third field-of-view region θ3. Thus, the region determination unit 23 determines which of the first field-of-view region θ1, the second field-of-view regions θ2L and θ2R, and the third field-of-view region θ3 is in the direction from the user 101 to the target 200.

The display control unit 15 is connected to the display unit 17. The display control unit 15 controls the display unit 17 according to the region in the direction from the user 101 to the target 200 identified by the region determination unit 23. The vibration control unit 16 is connected to the vibration unit 18. The vibration control unit 16 controls the vibration unit 18 according to the region in the direction from the user 101 to the target 200 identified by the region determination unit 23.

When the direction from the user 101 to the target 200 is to the first field-of-view region θ1, the display control unit 15 displays an image indicating the direction on the display unit 17. For example, the display control unit 15 displays a peripheral image on the display unit 17 and also displays a pointer or the like in the direction of the target 200. In this case, the vibration control unit 16 does not activate the vibration unit 18.

When the direction from the user 101 to the target 200 is to the second field-of-view region θ2L, θ2R, the display control unit 15 displays an image indicating the direction on the display unit 17. For example, the display control unit 15 displays a peripheral image on the display unit 17 and also displays a pointer or the like in the direction of the target 200. The vibration control unit 16 stimulates a sense of touch by allowing the vibration unit 18 to apply vibration to a portion corresponding to the direction of the target 200.

When the direction from the user 101 to the target 200 is to the third field-of-view region θ3, the vibration control unit 16 stimulates a sense of touch by allowing the vibration unit 18 to apply vibration to a portion corresponding to the direction of the target 200. In this case, the display control unit 15 displays a peripheral image on the display unit 17 but does not display a pointer or the like.

The display unit 17 is, for example, a head mounted-type display device. The display unit 17 is controlled by the display control unit 15 and can display a scenery image in front of the user 101 or a scenery image acquired by the camera 12. Furthermore, the display unit 17 is controlled by the display control unit 15 and can superimpose a virtual space on the scenery image in front of the user 101 and display the superimposed image.

In other words, when the direction to the target 200 is to the first field-of-view region θ1 or the second field-of-view region θ2L, θ2R, the display unit 17 superimposes a pointer or the like directed to the direction to the target 200 on the peripheral image and displays the superimposed image. In this case, the pointer is an image of a virtual space and is a display that points to an image of the target 200 or a display that points to the direction to the target 200. The image of the virtual space is not limited to a pointer but may be a circle sign or a highlight.

Figure 5:
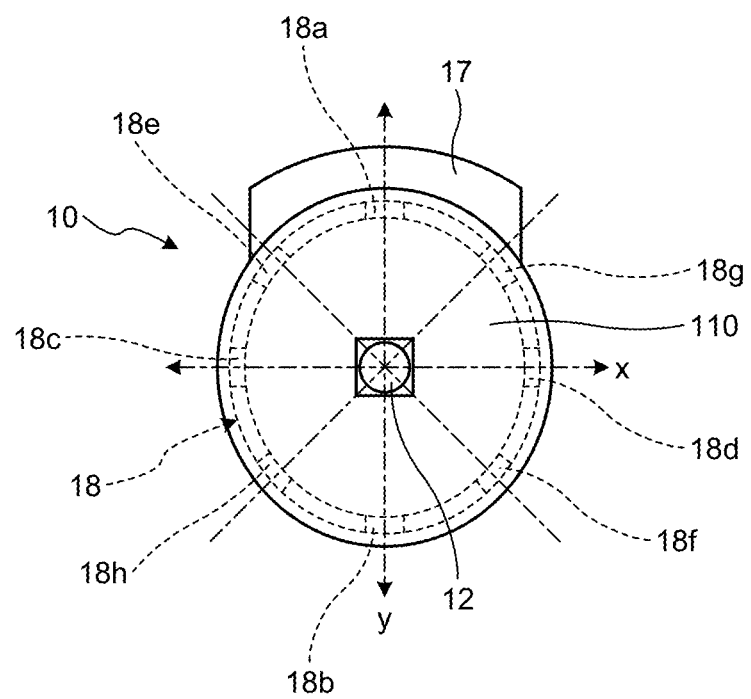
FIG. 5 is a plan view of the notification device.

FIG. 5 is a plan view of the notification device.

As illustrated in FIG. 5, the vibration unit 18 is provided around the helmet 110. The vibration unit 18 includes a plurality of (in the present embodiment, eight) vibrators 18a, 18b, 18c, 18d, 18e, 18f, 18g, and 18h. The number of vibrators 18a, 18b, 18c, 18d, 18e, 18f, 18g, and 18h is not limited to eight as long as an even number of vibrators are provided.

A plurality of vibrators 18a, 18b, 18c, 18d, 18e, 18f, 18g, and 18h are disposed to form a ring. A plurality of vibrators 18a, 18b, 18c, 18d, 18e, 18f, 18g, and 18h are disposed at equal intervals in the circumferential direction. In other words, the vibrators 18a and 18b are disposed at diametrically opposed positions on the helmet 110. The vibrators 18c and 18d are disposed at diametrically opposed positions on the helmet 110. The vibrators 18e and 18f are disposed at diametrically opposed positions on the helmet 110. The vibrators 18g and 18h are disposed at diametrically opposed positions on the helmet 110.

Basic Configuration and Action of Vibration Unit

Figure 6:
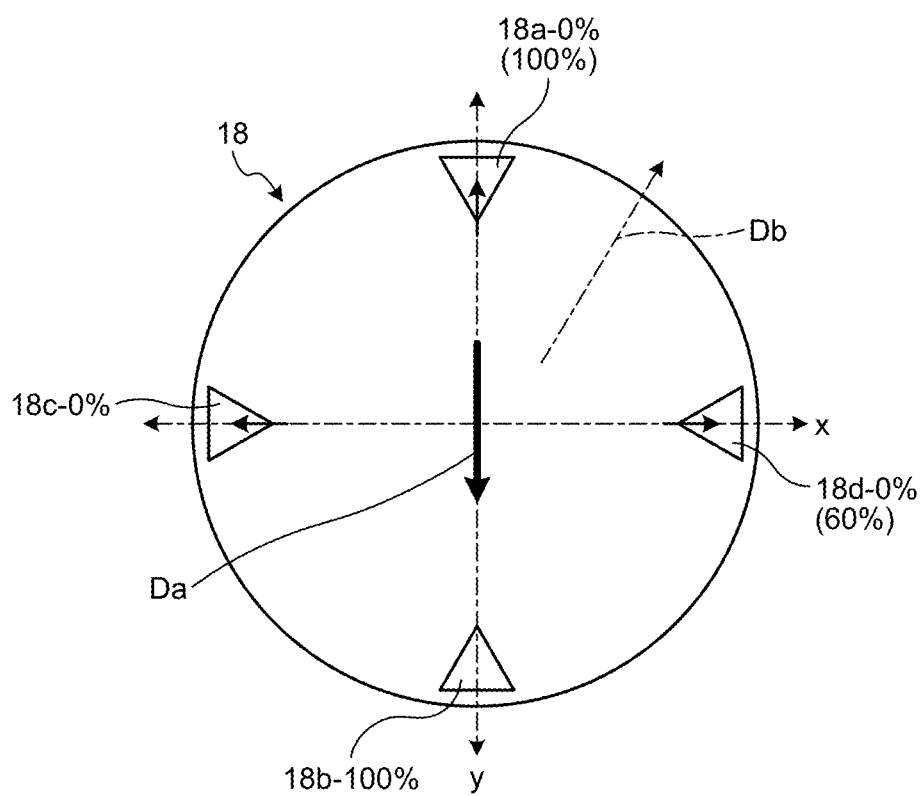
FIG. 6 is a schematic diagram illustrating the action of a vibration unit.

FIG. 6 is a schematic diagram illustrating the configuration and action of the vibration unit. In the following description, the vibration unit 18 will be described as having four vibrators 18a, 18b, 18c, and 18d.

As illustrated in FIG. 6, the vibration unit 18 includes four vibrators 18a, 18b, 18c, and 18d, which are disposed at equal intervals in the circumferential direction. In other words, the vibrators 18a and 18b are diametrically opposed to each other, and the vibrators 18c and 18d are diametrically opposed to each other. The required number of vibrators 18a, 18b, 18c, and 18d is the nth power of 2. The vibrators 18a, 18b, 18c, and 18d are disposed such that a pair has 180-degree point symmetry with respect to the center of the worn part (in the present embodiment, the head 102). Here, the vibrators 18a and 18b form a pair, and the vibrators 18c and 18d form a pair.

The vibration control unit 16, which controls the vibration unit 18, activates only one of a pair of vibrators 18a and 18b, or only one of a pair of the vibrators 18c and 18d. For example, when the user 101 is notified of a direction Da, only the vibrator 18b located ahead in the direction Da is activated and the other vibrators 18a, 18c, and 18d are not activated. In other words, the vibration of the vibrator 18b located ahead in the direction Da is set to 100%, and the vibration of the vibrators 18a, 18c, and 18d not ahead in the direction Da is set to 0%.

On the other hand, when the user 101 is notified of a direction Db, the vibrators 18a, 18b, 18c, and 18d are not located ahead in the direction Db. In this case, only the vibrators 18a and 18d located on both sides ahead in the direction Db are activated, and the other vibrators 18b and 18c are not activated. In other words, the vibration of the vibrator 18a located on one side ahead in the direction Db is set to 100%, the vibration of the vibrator 18d located on the other side ahead in the direction Db is set to 60%, and the vibration of the vibrators 18b and 18c not on either side ahead in the direction Db is set to 0%. In other words, for a control method of combined vibration, when the spatial coordinates of the target 200 identified are (x, y, z), two vibrators on both sides in the direction of the target 200 are each vibrated with an intensity according to the ratio of values of x and y. For example, when the (x, y) coordinates of the target 200 are x=6 and y=10, the vibrator 18a is vibrated with an intensity of 100% and the vibrator 18d is vibrated with an intensity of 60%.

Notification Method

Figure 7:
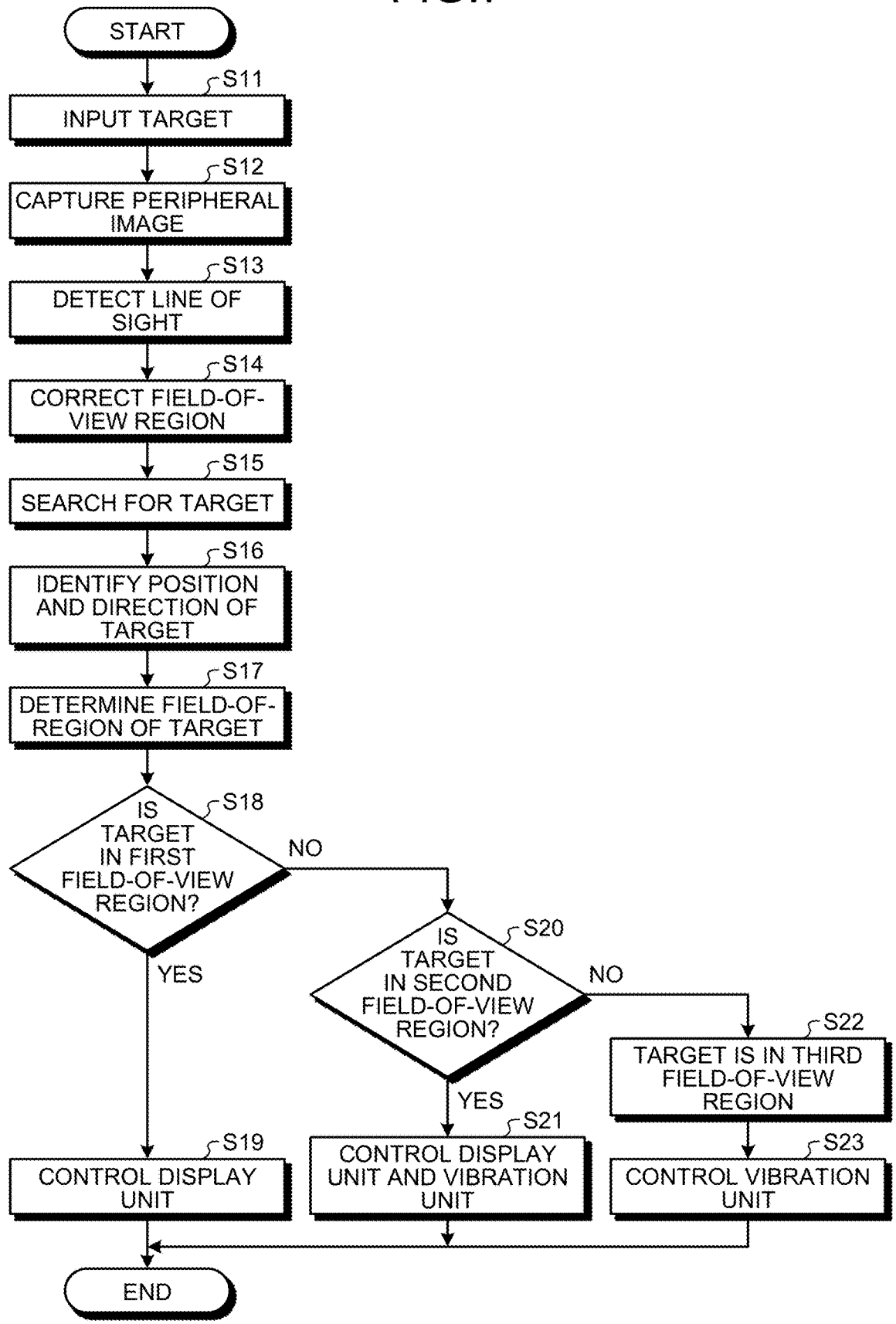
FIG. 7 is a flowchart illustrating a notification method.
Figure 8:
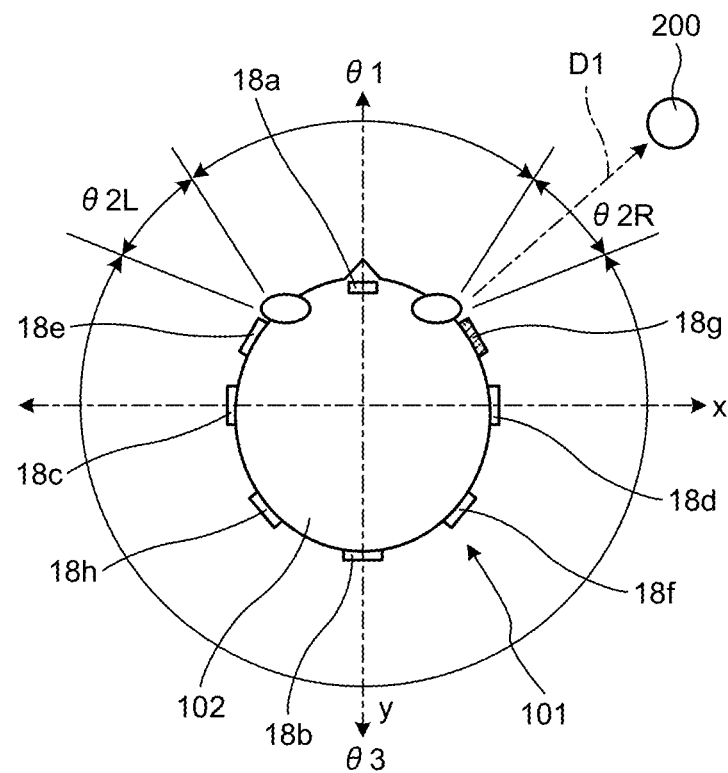
FIG. 8 is an illustration depicting the notification method when a target is in a second field-of-view region.
Figure 9:
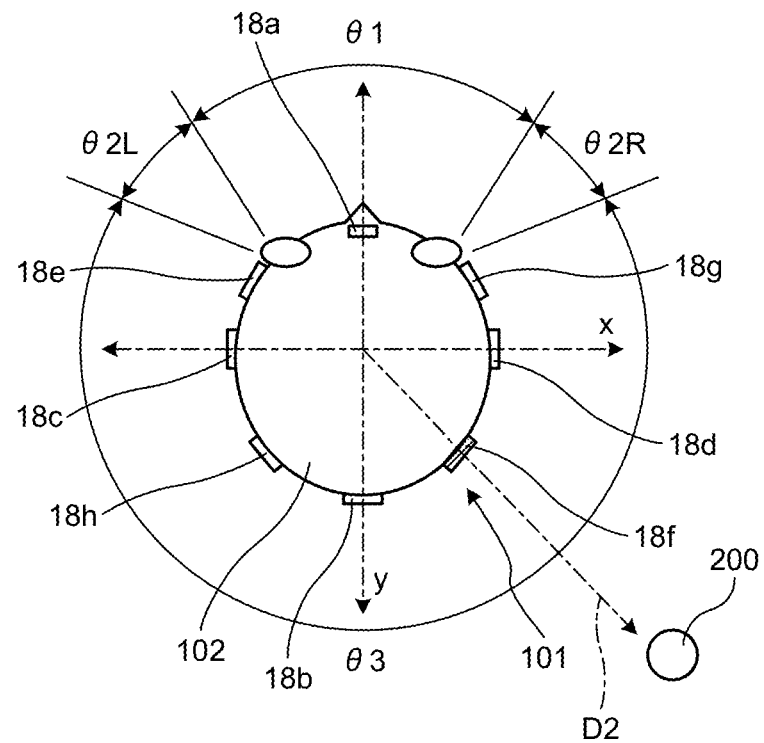
FIG. 9 is an illustration depicting the notification method when a target is in a third field-of-view region.
Figure 10:
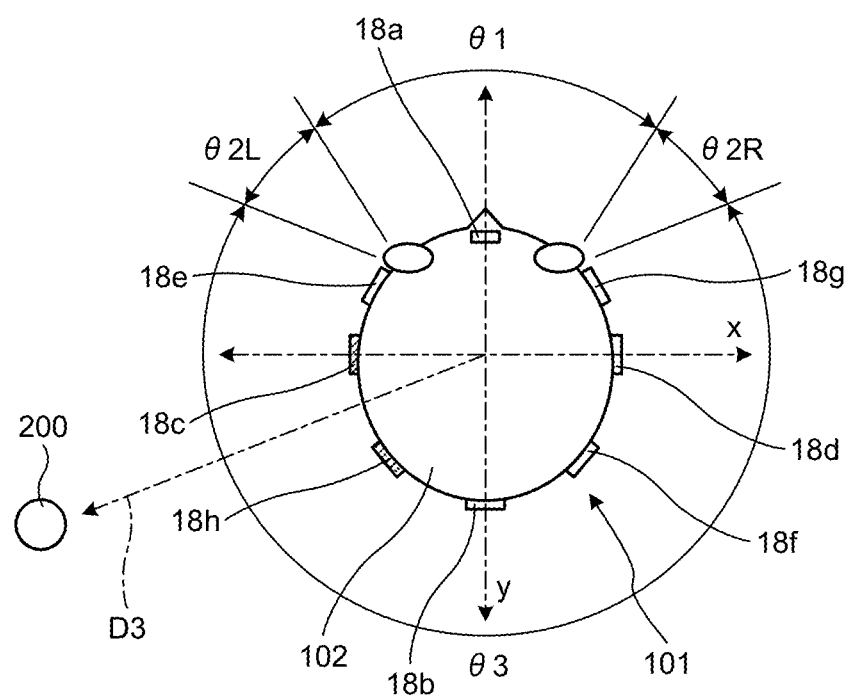
FIG. 10 is an illustration depicting another notification method when a target is in the third field-of-view region.

FIG. 7 is a flowchart illustrating a notification method. FIG. 8 is an illustration depicting the notification method when the target is in the second field-of-view region, and FIG. 9 is an illustration depicting the notification method when the target is in the third field-of-view region. FIG. 10 is an illustration depicting another notification method when the target is in the third field-of-view region.

As illustrated in FIGS. 1 and 2, the user 101 wears the helmet 110 with the notification device 10 mounted thereon on the head 102. In this state, as illustrated in FIGS. 3 and 7, at step S11, the user 101 operates the input unit 11 and inputs the target 200 to be searched for. At step S12, the camera 12 captures and acquires a peripheral image of the user 101 and outputs the acquired image to the processing unit 14. At step S13, the line-of-sight detection unit 13 detects the line of sight of the user 101 and outputs the detected line of sight to the processing unit 14.

At step S14, the region correction unit 22 of the processing unit 14 corrects the range (size) of the first field-of-view region θ1 based on the input peripheral image. The region correction unit 22 also corrects the position of the first field-of-view region θ1 based on the line of sight of the user 101. At step S15, the search unit 31 of the target identification unit 21 in the processing unit 14 finds an image of the target 200 in the input peripheral image. The search unit 31 may use the communication unit 42 to find the position of the target 200. At step S16, the direction identification unit 32 of the target identification unit 21 identifies the direction (azimuth) from the user 101 to the target 200, based on the position of the target 200 found by the search unit 31.

The processing at step S14 and the processing at steps S15 and S16 may be executed in reverse order or may be executed simultaneously.

At step S17, the region determination unit 23 of the processing unit 14 determines which of the first field-of-view region θ1, the second field-of-view regions θ2L and θ2R, and the third field-of-view region θ3 is in the direction from the user 101 to the target 200 identified by the target identification unit 21. Here, the first field-of-view region θ1 is the preset one or the one corrected by the region correction unit 22. The second field-of-view regions θ2L and θ2R and the third field-of-view region θ3 are the preset regions. In other words, the region determination unit 23 determines which of the first field-of-view region θ1, the second field-of-view regions θ2L and θ2R, and the third field-of-view region θ3 is in the direction from the user 101 (coordinate center) to the target 200, in the spatial coordinate system with the center of the helmet 110 as the coordinate center.

In other words, at step S18, the region determination unit 23 determines whether the direction from the user 101 to the target 200 is to the first field-of-view region θ1. At step S19, if the region determination unit 23 determines that the direction from the user 101 to the target 200 is to the first field-of-view region θ1 (Yes), the display control unit 15 activates and controls the display unit 17. In other words, the display control unit 15 displays a peripheral image in front of the user 101 on the display unit 17, and also superimposes a pointer directed to the direction of the target 200 on the peripheral image and displays the superimposed image. In this case, the vibration control unit 16 does not activate the vibration unit 18.

The user 101 recognizes the direction of the target 200 by the pointer on the peripheral image displayed on the display unit 17. Thus, the user 101 can find the target 200 or the direction in which the target 200 is located.

On the other hand, at step S18, if the region determination unit 23 determines that the direction from the user 101 to the target 200 is not to the first field-of-view region θ1 (No), the process moves to step S20. At step S20, the region determination unit 23 determines whether the direction from the user 101 to the target 200 is to the second field-of-view region θ2L, θ2R. At step S21, if the region determination unit 23 determines that the direction from the user 101 to the target 200 is to the second field-of-view region θ2L, θ2R (Yes), the display control unit 15 activates and controls the display unit 17, and the vibration control unit 16 activates and controls the vibration unit 18.

In other words, the display control unit 15 displays a peripheral image in front of the user 101 on the display unit 17, and also superimposes a pointer directed to the direction of the target 200 on the peripheral image and displays the superimposed image. The vibration control unit 16 stimulates a sense of touch by allowing the vibration unit 18 to apply vibration to a portion corresponding to the direction of the target 200. For example, as illustrated in FIG. 8, when the direction D1 from the user 101 to the target 200 is in the second field-of-view region θ2R, only the vibrator 18g in the second field-of-view region θ2R in the direction D1 to the target 200 is vibrated, and the other vibrators 18a, 18b, 18c, 18d, 18e, 18f, and 18h are not vibrated. In other words, the vibrators 18a and 18g are vibrated with an intensity based on the x, y coordinates of the direction D1.

The user 101 recognizes the direction of the target 200 by the pointer on the peripheral image displayed on the display unit 17. However, the pointer on the peripheral image is difficult to recognize because it is in the second field-of-view region θ2L, θ2R. However, in this case, the user 101 is given vibration from the vibration unit 18 at a portion corresponding to the direction of the target 200. Thus, the user 101 can visually and tactilely find the target 200 or the direction in which the target 200 is located.

On the other hand, at step S20, if the region determination unit 23 determines that the direction from the user 101 to the target 200 is not to the second field-of-view region θ2L, θ2R (No), the process moves to step S22. At step S22, the region determination unit 23 determines that the direction from the user 101 to the target 200 is to the third field-of-view region θ3. Then, at step S23, the vibration control unit 16 activates and controls the vibration unit 18.

In other words, the vibration control unit 16 stimulates a sense of touch by allowing the vibration unit 18 to apply vibration to a portion corresponding to the direction of the target 200. For example, as illustrated in FIG. 9, when the direction D2 from the user 101 to the target 200 is in the third field-of-view region θ3, only the vibrator 18f in the third field-of-view region θ3 in the direction D2 to the target 200 is vibrated, and the other vibrators 18a, 18b, 18c, 18d, 18e, 18g, and 18h are not vibrated. As illustrated in FIG. 10, when the direction D3 from the user 101 to the target 200 is in the third field-of-view region θ3, only two vibrators 18c and 18h in the third field-of-view region θ3 on both sides of the direction D3 to the target 200 are vibrated, and the other vibrators 18a, 18b, 18d, 18e, 10f, and 18g are not vibrated.

In this case, the display control unit 15 displays a peripheral image on the display unit 17 but does not display a pointer or the like.

Since the target 200 is not in the first field-of-view region θ1 or the second field-of-view region θ2L, θ2R but in the third field-of-view region θ3, the user 101 is unable to see the pointer on the peripheral image displayed on the display unit 17. In this case, the user 101 is given vibration from the vibration unit 18 at a portion corresponding to the direction of the target 200. Thus, the user 101 can tactilely recognize the target 200 or the direction in which the target 200 is located.

When the target 200 is in the second field-of-view region θ2L, θ2R or the third field-of-view region θ3, the user 101 is guided by the vibration applied by the vibration unit 18 and tries to find the target 200 by rotating the head 102 in the direction of the vibration, that is, in the direction of the target 200. In other words, the target 200, which has been in the second field-of-view region θ2L, θ2R, comes into the first field-of-view region θ1. In this case, the process moves from step S18 to step S19, and the processing at step S19 is executed. Furthermore, the target 200, which has been in the third field-of-view region θ3, comes into the first field-of-view region θ1 through the second field-of-view region θ2L, θ2R. In this case, the process moves from step S20 to step S21, and after the processing at step S21 is executed, the process moves from step S18 to step S19, and the processing at step S19 is executed.

In other words, when the target 200 comes into the first field-of-view region θ1, the display control unit 15 displays the front peripheral image on the display unit 17, and also superimposes a pointer directed to the direction of the target 200 on the front peripheral image and displays the superimposed image. Then, when the target 200 moves from the second field-of-view region θ2L, θ2R to the first field-of-view region θ1, the vibration control unit 16 stops the activation of the vibration unit 18. When the target 200 moves from the third field-of-view region θ to the first field-of-view region θ1 through the second field-of-view region θ2L, θ2R, the vibration control unit 16 changes the position of vibration by the vibration unit 18 and finally stops the activation.

The magnitude of vibration applied to the head 102 by the vibration unit 18 may be increased from the first field-of-view region θ1 toward the third field-of-view region θ3. In other words, the vibration control unit 16 may control the magnitude of vibration by the vibration unit 18 according to the position of the target 200.

Operation Effects of Embodiment

The notification device 10 of the present embodiment includes the display unit 17 configured to display an image, the vibration unit 18 configured to apply (stimulate) vibration (sense of touch) to the user 101, the target identification unit 21 configured to identify the direction from the user 101 to the target 200, the region determination unit 23 configured to determine which of a first field-of-view region having a predetermined region, a second field-of-view region adjacent to the first field-of-view region, and a third field-of-view region adjacent to the second field-of-view region is in the direction identified by the target identification unit 21, and the display control unit 15 and the vibration control unit 16 configured to control the display unit 17 and the vibration unit 18 based on a determination result of the region determination unit 23. When the direction is to the second field-of-view region (peripheral field of view) θ2L, θ2R, the display control unit 15 displays an image indicating the direction on the display unit 17 and controls the vibration control unit 16 according to the direction.

Thus, when the direction from the user 101 to the target 200 is to the effective field of view, an image indicating the direction (for example, a pointer) is displayed so as to be superimposed on a peripheral image on the display unit 17 for the user 101. Thus, the user 101 can easily find the target 200 by the image indicating the direction. On the other hand, when the direction from the user 101 to the target 200 is to the ineffective field of view outside the effective field of view or the peripheral field of view, vibration is applied to a portion corresponding to the direction in the user 101. Thus, the user 101 can recognize by vibration the direction of the invisible target 200 and can easily find the target 200.

Furthermore, when the direction from the user 101 to the target 200 is to the peripheral field of view, an image indicating the direction is displayed so as to be superimposed on a peripheral image on the display unit 17 for the user 101, and in addition, vibration is applied to a portion corresponding to the direction in the user 101. Thus, the user 101 can recognize by vibration the direction of the target 200 present in the peripheral field of view and difficult to find, and can easily find the target 200.

The notification device 10 of the present embodiment includes the camera (image acquisition unit) 12 configured to acquire an image of at least the first field-of-view region θ1 and the second field-of-view regions θ2L and θ2R, and the region correction unit 22 configured to correct the size of the first field-of-view region θ1 according to the amount of edges extracted from the image of the first field-of-view region θ1 and the second field-of-view regions θ2L and θ2R. Thus, when the amount of edges in the first field-of-view region θ1 and the second field-of-view regions θ2L and θ2R is larger than a threshold, the amount of information in the first field-of-view region θ1 and the second field-of-view regions θ2L and θ2R is large. When the amount of information is large, by correcting the size of the first field-of-view region θ1 to be narrower, the user 101 can easily find the target 200 by the image indicating the direction that is displayed on the display unit 17.

The notification device 10 of the present embodiment includes the line-of-sight detection unit 13 configured to detect the line of sight of the user 101, and the region correction unit 22 configured to identify the gaze point of the user 101 based on the line of sight of the user 101 detected by the line-of-sight detection unit 13 and correct the position of the first field-of-view region θ1 according to the position of the gaze point. Thus, the position of the first field-of-view region θ1 can be set accurately with respect to the line of sight of the user 101.

In the above embodiment, the display unit 17 is an augmented reality (AR) display device, but is not limited to this configuration. For example, the display unit 17 may be a virtual reality (VR) display device, a mixed reality (MR) display device, or a substitutional reality (SR) display device, serving as a cross reality (XR) display device.

In the above embodiment, the user 101 is notified of the direction Db by combined vibration when there is no vibrator ahead in the direction D, but the embodiment is not limited to this configuration. For example, the image may be divided equally by the number of vibrators 18*a*, 18*b*, 18*c*, 18*d*, 18*e*, 18*f*, 18*g*, and 18*h*, and each region may be allocated to a corresponding one of vibrators 18*a*, 18*b*, 18*c*, 18*d*, 18*e*, 18*f*, 18*g*, and 18*h*. One of the vibrators 18*a*, 18*b*, 18*c*, 18*d*, 18*e*, 18*f*, 18*g*, and 18*h* that corresponds to the region including the coordinates of the target 200 may be vibrated.

The notification device 10 according to the present disclosure has been described above. However, the notification device 10 may be implemented in a variety of different forms other than the above embodiment.

Each component of the notification device 10 illustrated in the drawings is a functional concept and is not necessarily physically configured as illustrated in the drawings. In other words, the specific form of each device is not limited to those illustrated in the drawings. The whole or some of the devices may be functionally or physically distributed or integrated in any units, depending on the processing burden and use condition of each device.

The configuration of the notification device 10 is implemented, for example, as software, by a computer program loaded into a memory. The above embodiment has been described as functional blocks implemented by cooperation of such hardware or software. In other words, these functional blocks can be implemented in various forms by hardware alone, software alone, or a combination thereof.

The above components include those that can be easily conceived by those skilled in the art and those that are substantially identical. Furthermore, the above configurations can be combined as appropriate. Various omissions, substitutions, or modifications of the configurations can be made without departing from the spirit of the invention.

The notification device, the notification method, and the computer program of the present disclosure can be applied, for example, to an image display device.

The computer program for implementing the notification method according to the present disclosure may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

The present disclosure can achieve the effect of being capable of accurately notifying a user of the direction of a target relative to the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A notification device comprising:
    a display unit configured to display an image;
    a memory that stores executable components; and
    a processor that executes the executable components, the executable components comprising:
        a vibration unit that stimulates a sense of touch for a user;
        a target identification unit that identifies a direction from the user to a target;
        an image acquisition unit that acquires images of a first field-of-view region having a predetermined region, a second field-of-view region adjacent to the first field-of-view region, and a third field-of-view region adjacent to the second field-of-view region;
        a region correction unit that corrects a size of the first field-of-view region according to an amount of edges extracted from the images of the first field-of-view region and the second field-of-view region;

a region determination unit that determines which of the first field-of-view region, the second field-of-view region, or the third field-of-view region is in the direction identified by the target identification unit; and a control unit that controls the display unit and the vibration unit based on a determination result of the region determination unit, wherein in response to determining that the direction is to the second field-of-view region, the control unit displays an image indicating the direction on the display unit and control the vibration unit according to the direction.

2. The notification device according to claim 1, the executable components further comprising:

a line-of-sight detection unit that detects a line of sight of the user; and a region correction unit that identifies a gaze point of the user based on the line of sight of the user detected by the line-of-sight detection unit and correct a position of the first field-of-view region according to a position of the gaze point.

3. The notification device according to claim 1, wherein in response to determining that the direction is to the first field-of-view region, the control unit displays an image indicating the direction on the display unit without activating the vibration unit.

4. The notification device according to claim 1, wherein in response to determining that the direction is to the third field-of-view region, the control unit is stimulates a sense of touch by allowing the vibration unit to apply vibration to a portion corresponding to the direction.

5. The notification device according to claim 4, wherein a magnitude of vibration applied to a head of the user by the vibration unit is increased from the first field-of-view region toward the third field-of-view region.

6. A notification method comprising:

acquiring images of at least a first field-of-view region having a predetermined region, a second field-of-view region adjacent to the first field-of-view region, and a third field-of-view region adjacent to the second field-of-view region;

correcting a size of the first field-of-view region according to an amount of edges extracted from the images of the first field-of-view region and the second field-of-view region;

identifying a direction from a user to a target;

determining which of the first field-of-view region, the second field-of-view region or the third field-of-view region is in the direction identified; and in response to determining that the direction is to the second field-of-view region, displaying an image indicating the direction and controlling vibration to stimulate a sense of touch according to the direction.

7. A non-transitory computer-readable storage medium storing a computer program causing a computer to execute:

acquiring images of at least a first field-of-view region having a predetermined region, a second field-of-view region adjacent to the first field-of-view region, and a third field-of-view region adjacent to the second field-of-view region;

correcting a size of the first field-of-view region according to an amount of edges extracted from the images of the first field-of-view region and the second field-of-view region;

identifying a direction from a user to a target;

determining which of the first field-of-view region, the second field-of-view region or the third field-of-view region is in the direction identified; and in response to determining that the direction is to the second field-of-view region, displaying an image indicating the direction and controlling vibration to stimulate a sense of touch according to the direction.

\* \* \* \* \*